Figure 1:
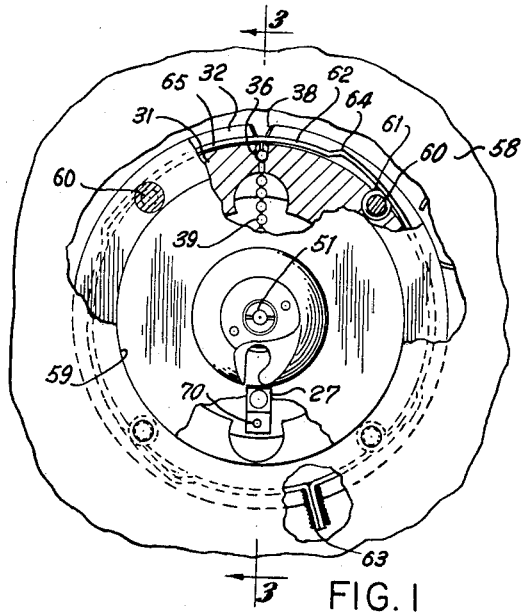

July 20, 1965

O. E. MULLINS ETAL 3,196,452

CHART CHANGING MECHANISMS

Filed Jan. 14, 1963

5 Sheets-Sheet 1

INVENTORS
Orvel E. Mullins
Oliver W. Cole

BY *Ahley & Ahley*

ATTORNEYS

July 20, 1965  O. E. MULLINS ETAL  3,196,452
CHART CHANGING MECHANISMS

Filed Jan. 14, 1963  5 Sheets-Sheet 2

INVENTORS
Orvel E. Mullins
Oliver W. Cole

BY *Ehley & Ehley*

ATTORNEYS

July 20, 1965
O. E. MULLINS ETAL
3,196,452
CHART CHANGING MECHANISMS
Filed Jan. 14, 1963
5 Sheets-Sheet 3
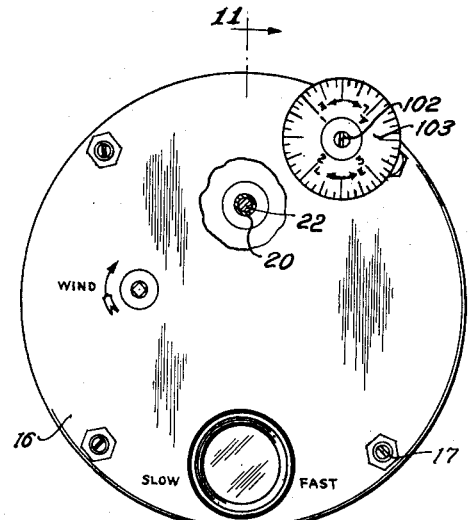
FIG. 9
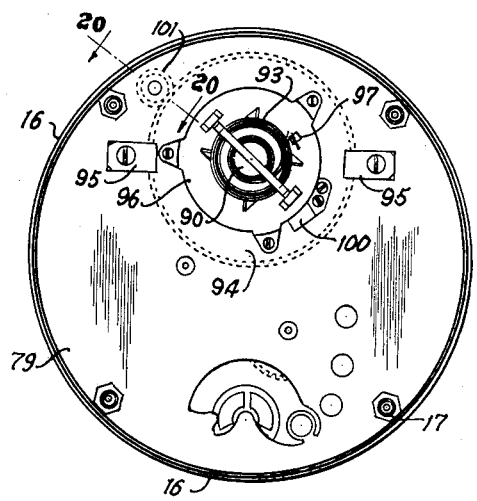
FIG. 10
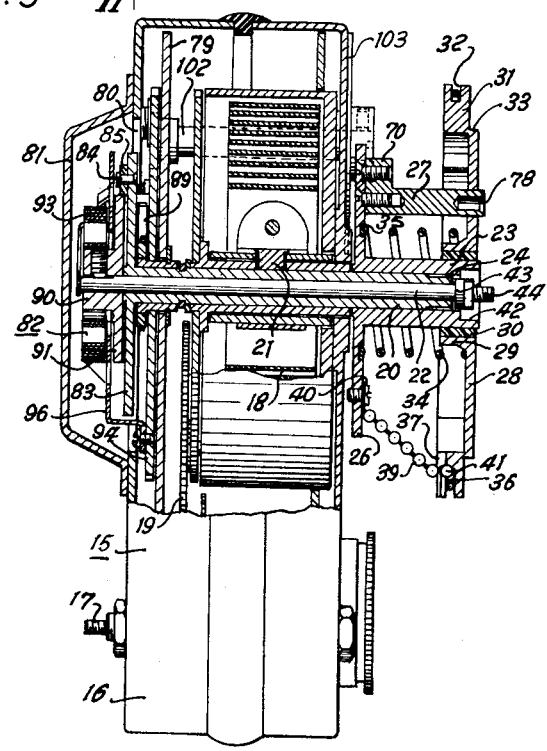
FIG. 11
FIG. 16
INVENTORS
Orvel E. Mullins
Oliver W. Cole
BY *Ahley & Ahley*
ATTORNEYS July 20, 1965

O. E. MULLINS ETAL 3,196,452

CHART CHANGING MECHANISMS

Filed Jan. 14, 1963

5 Sheets-Sheet 4

INVENTORS
Orvel E. Mullins
Oliver W. Cole

BY *Ashley & Ashley*

ATTORNEYS

July 20, 1965
O. E. MULLINS ETAL
3,196,452
CHART CHANGING MECHANISMS
Filed Jan. 14, 1963
5 Sheets-Sheet 5
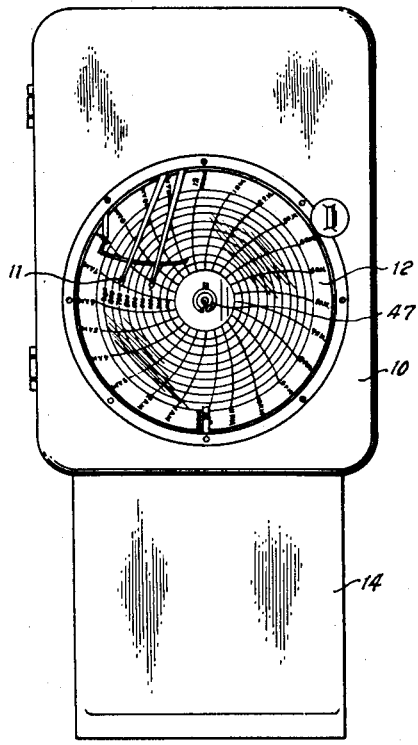
FIG. 18
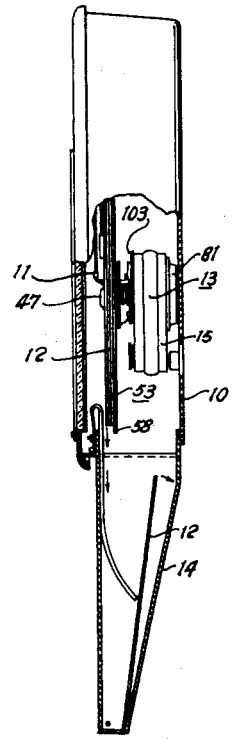
FIG. 19
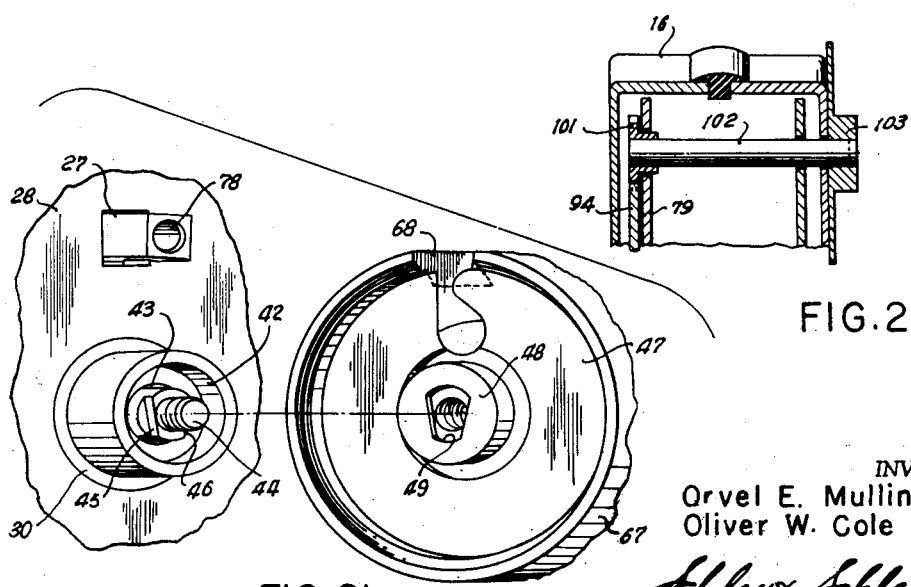
FIG. 20
FIG. 21
INVENTORS
Orvel E. Mullins
Oliver W. Cole
BY *Ashley & Ashley*
ATTORNEYS

United States Patent Office 3,196,452
Patented July 20, 1965

3,196,452
CHART CHANGING MECHANISMS
Orvel E. Mullins and Oliver W. Cole, Dallas, Tex., assignors to Mullins Manufacturing Company, a corporation of Texas
Filed Jan. 14, 1963, Ser. No. 251,285
5 Claims. (Cl. 346—137)

This invention relates to new and useful improvements in chart changing mechanisms.

The invention is particularly concerned with improvements in chart changers for recording meters in which a stack of superposed recording charts are revolved with a chart plate for the recording of data on the outermost chart.

An important object of the invention is to provide an improved chart changer having unique and improved means for causing a stack of superposed charts to be revolved in unison with a chart plate upon which they are mounted, wherein unique means are provided for holding the chart plate in a retracted position while a stack of charts is being loaded thereon, and which has improved and very positive means for locking the chart plate upon the driving mechanism.

A further object of the invention is to provide improved and unique means for loading a stack of superimposed charts on the chart plate.

A further and important object of the invention is to provide an improved chart changer having means for quickly and readily varying the time of the day or night, or the time during one revolution of the chart plate, that the outermost chart is discharged therefrom.

Yet another object of the invention is to provide improved chart changers having means limiting forward movement of the chart plate, said means being quickly and readily disconnectable for complete removal of the chart plate assembly.

A construction designed to carry out the invention will be hereinafter described, together with other features of the invention.

Figure 2:
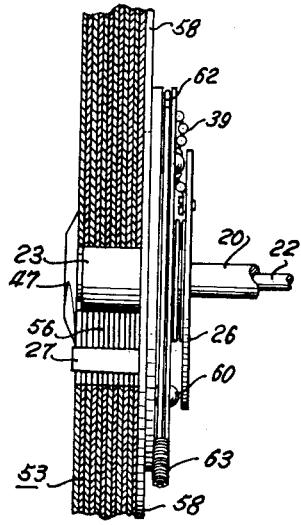
Figure 3:
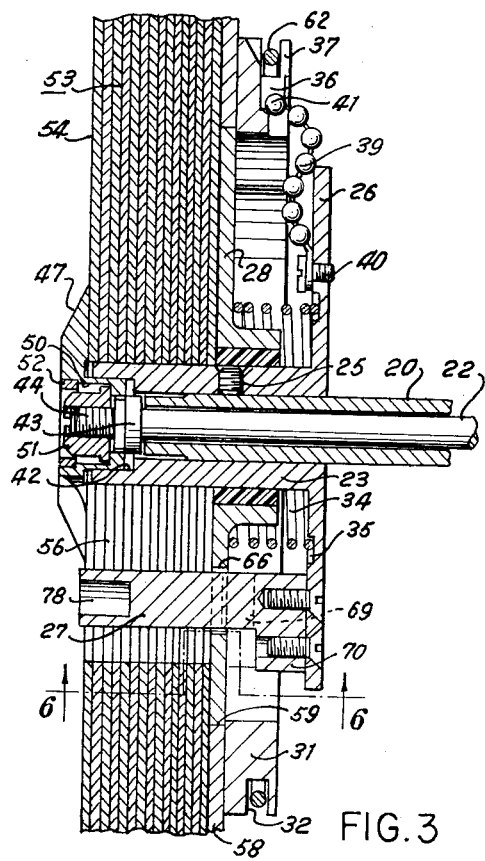
Figure 4:
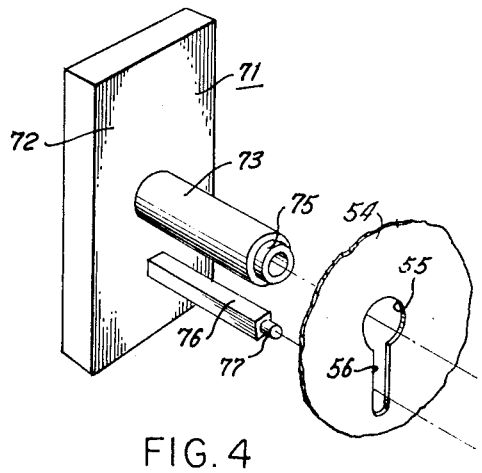
Figure 5:
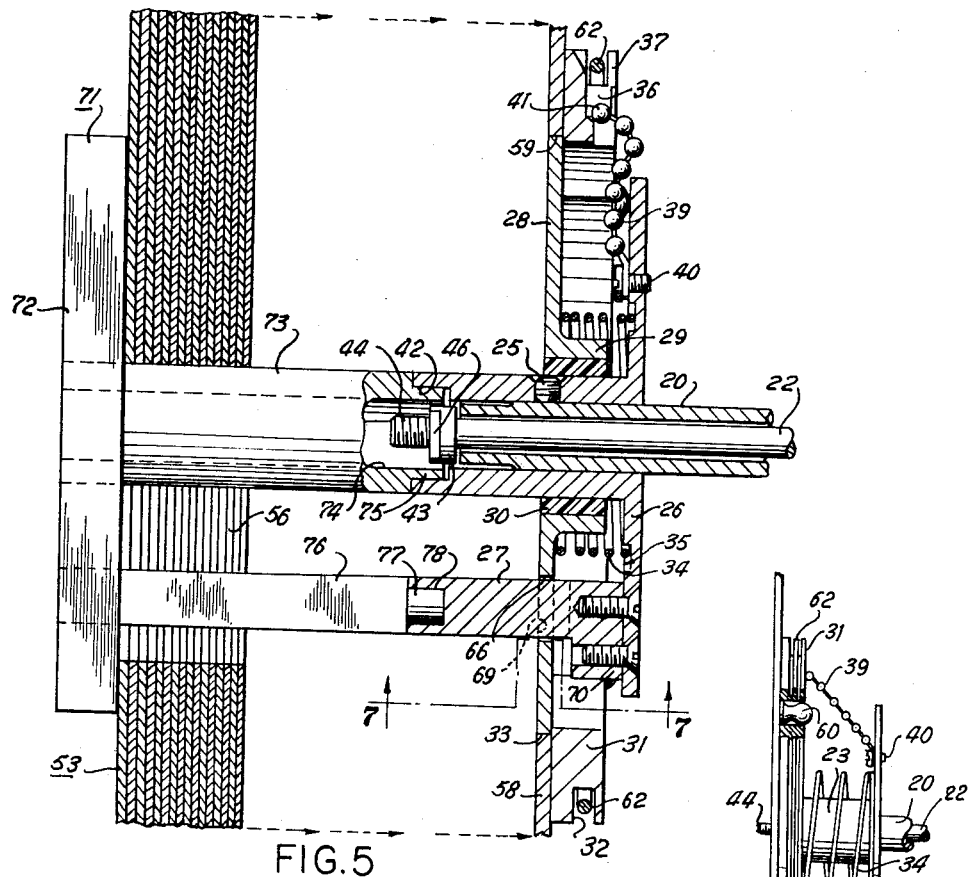
Figure 6:
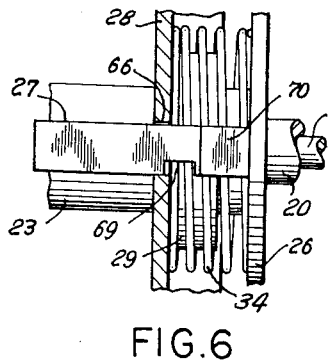
Figure 7:
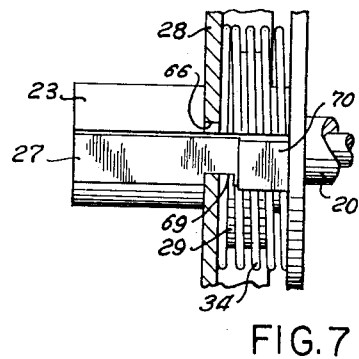
Figure 8:
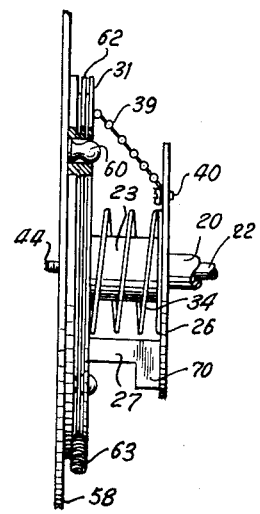

The invention will be more readily understood from a reading of the following specification and by reference to the accompanying drawings, wherein an example of the invention is shown, and wherein:

FIG. 1 is an enlarged fragmentary view of a chart changer constructed in accordance with the invention, the view being taken from the front of the chart changer and showing the central portion thereof partially broken away to illustrate the structure, FIG. 2 is a fragmentary right-hand elevation of the structure of FIG. 1, the charts being broken away to show the structure, FIG. 3 is an enlarged, vertical, sectional view taken on the line 3—3 of FIG. 1, FIG. 4 is an exploded view in perspective illustrating the chart loading tool and its relationship to the charts, FIG. 5 is an enlarged, vertical sectional view illustrating the use of the loading tool with the chart changer to load charts thereon, FIG. 6 is a fragmentary cross-sectional view taken on the line 6—6 of FIG. 3 and showing the means for retaining the chart plate in its retracted position, FIG. 7 is a view similar to FIG. 6, showing the chart plate locked in a retracted position, and taken upon the line 7—7 of FIG. 5, FIG. 8 is a view similar to FIG. 2 showing the chart plate in its forward position with the discharge button removed.

Figure 12:
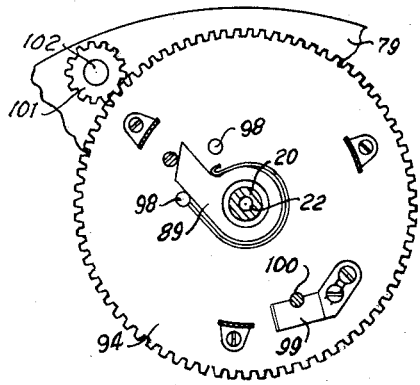
Figure 13:
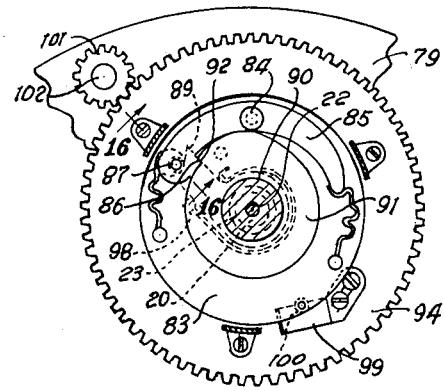
Figure 14:
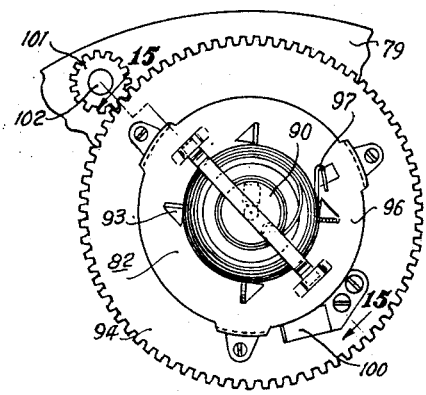
Figure 17:
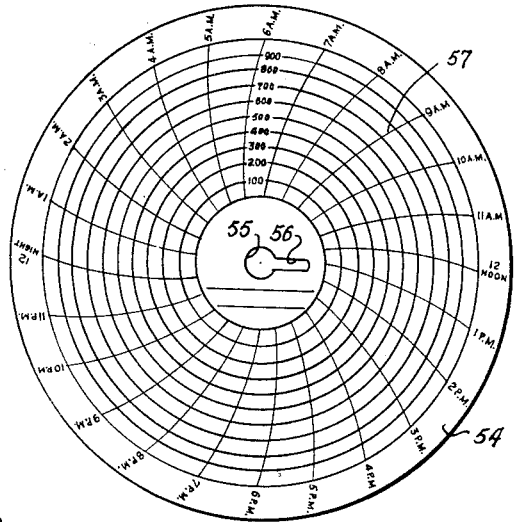
Figure 15:
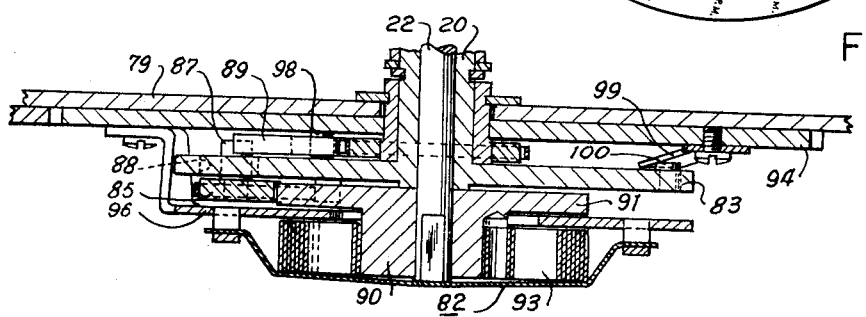

FIG. 9 is a front elevational view of the clock or drive housing,

FIG. 10 is a rear elevational view of the clock housing taken just inside the rearward wall thereof to illustrate the fly-back mechanism, FIG. 11 is an enlarged, vertical, sectional view taken on the line 11—11 of FIG. 9, FIG. 12 is an enlarged sectional view showing the gear wheel carrying the discharge cam, FIG. 13 is a view similar to FIG. 12 showing the discharge pawl portion of the fly-back mechanism, FIG. 14 is a view similar to FIGS. 12 and 13 showing the fly-back spring arrangement, FIG. 15 is an enlarged, cross-sectional view taken on the line 15—15 of FIG. 14, FIG. 16 is an enlarged, cross-sectional view taken on the line 16—16 of FIG. 13, FIG. 17 is a front elevational view of one of the recording charts, FIG. 18 is a front elevational view of a meter housing having therein the chart changer of this invention, FIG. 19 is a side elevational view, partly broken away, of the meter housing and chart changer of FIG. 18, FIG. 20 is an enlarged cross-sectional view taken on the line 20—20 of FIG. 10, and FIG. 21 is an exploded view in perspective showing the inter-relationship of the changer button and the shaft on which it is mounted.

This invention is directed to certain subject matter to which United States Letters Patent No. 2,978,287, issued April 4, 1961 and our copending application, Serial No. 43,487, filed July 18, 1960, now Patent No. 3,109,694 relate, and reference is made thereto.

In the drawings, the numeral 10 designates a meter case or housing (FIG. 18) having therein a conventional metering device (not shown) for continuously measuring temperature, pressure, or other desired information or data and for recording such measurements by one or more recording pens or stylii 11 upon a circular recording chart 12. The chart changer of this invention, indicated generally at 13, functions to discharge the outermost one of the stack of charts 12 as each complete revolution of the charts is completed, and thereby to cause the outermost chart to drop into a receptacle 14 depending from the bottom of the meter case 10. Periodically the accumulated charts are removed from the receptacle 14, and thus there is no requirement that a workman service the meter once each 24 hours or at the end of whatever other period of time is required for one complete revolution of the charts, and instead, the meter may be serviced and new charts placed thereon at infrequent intervals.

The chart changer is associated with and incorporated in a conventional clock drive mechanism 15 or other conventional time controlled driving mechanism such as an electric or gas operated clock, the clock mechanism 15 having the usual case 16 having suitable means such as the bolts 17 for mounting in the meter case 10 and including an internal spring 18 and conventional clock work 19 for revolving on a time controlled basis a main or chart plate drive shaft 20. Desirably, the chart plate drive shaft 20 is driven frictionally by the driving mechanism of the clock as by the friction element 21.

The drive shaft 20 is tubular and receives interiorly a release button drive shaft 22 rotatably mounted within the tubular drive shaft 20, and receives exteriorly a cylindrical hub 23 to which it is splined at 24 at its forward end, the hub 23 also being secured to the drive shaft 20 by a radial set screw 25 (FIGS. 3 and 5). Thus, the shaft 20 drives the hub 23 rotationally, but the chart release shaft 22 is free to revolve within the shaft 20.

The hub 23 is formed with an annular, outwardly extending circular flange 26 at its rearward end, the flange 26 being spaced forwardly a short distance from the front wall of the clock casing 16 and having mounted on its marginal portion a forwardly extending drive pin 27 of rectangular cross section, the drive pin 27 extending parallel to the axis of the hub 23 and being spaced radially outwardly therefrom.

On the forward end of the hub 23 is carried a circular chart disk mounting plate 28 having a rearwardly projecting central hub 29 having pressed thereinto a suitable antifriction bearing sleeve or bushing 30 formed of neoprene or some other suitable antifriction material and slidably engaging the outer surface of the hub 23. On its periphery, the plate 28 has a rearwardly offset marginal flange 31 formed with a circumferential groove 32, the rearward offsetting of the flange 31 providing a shallow annular outwardly facing shoulder 33 on the forward face of the plate 28 spaced inwardly from the periphery thereof. A coiled compression spring 34 surrounds the hub 23 and the hub 29 and is confined between the rearward face of the plate 28 and a circular groove 35 formed in the forward base of the flange 26 so as to urge the plate 28 constantly forwardly upon the hub 23. The plate 28 has cut in its margin, preferably diametrically opposite the driving pin 27, a cylindrical recess 36 extending radially inwardly from its outer periphery through the groove 32, and having its rearward side communicating with a narrow radial slot 37 extending radially inwardly through the flange 32 and being widened or divergent at its outer end as indicated at 38 in FIG. 1. A retaining member, such as the flexible bead chain 39 has its rearward end secured to the flange 26 by the screw 40, while its outermost bead 41 is received within the recess 36 so as to limit outward movement of the plate 28 upon the hub 23. At the same time, by the manual disengagement of the outermost bead 41 from the recess 36, the retaining chain is quickly and readily disengaged from the plate 28 so that the latter may be removed forwardly from the hub 23.

The outer end of the hub 23 is counterbored to form a circular recess 42, and the outer end of the shaft 20 terminates slightly short of the bottom of the recess 42 as shown in FIGS. 3 and 5. The chart release shaft 22 carries an enlarged head 43 on its outer end, extending from a point closely adjacent the outer end of the shaft 20 into the recess 42 and terminating in a reduced screwthreaded pin 44 projecting outwardly from the recess 42 As shown in FIG. 21, the head 43 is cut away on its outer end within the recess 42 chordally at 45 and 46 in planes parallel to the axis of the head but not parallel to one another so as to present an end portion on the head 43 having a non-circular asymmetrical cross-section. A chart release button 47, substantially identical in outer configuration to the chart release button 10 of the aforementioned United States Letters Patent No. 2,978,287, has an axial hub 48 on its rearward side, the hub having a centrally located recess 49 complementary in shape to the asymmetrical outer end of the head 43 and adapted to receive the same in non-rotational relationship and in a predetermined azimuthal orientation. As shown in FIG. 3, the button 47 has an axial recess 50 in its forward face within which a flanged retaining nut 51 is held by a snap ring 52, the nut 51 being rotatable independently of the button 47 and being received in screwthreaded relationship upon the screwthreaded pin 44 for locking the button 47 upon the outer end of the shaft 22. The hub 48 of the button 47 is, of course, received in the recess 42 of the hub 23 but does not seat on the bottom thereof nor does the rearward face of the button 47 seat upon the outer end of the hub 23 so that the button is free to undergo limited wobbling movement with respect to the hub 23.

A plurality or stack 53 of individual recording charts 54 are adapted to be received upon the hub 23 and the drive pin 27, and confined on the hub between the flange 26 and the discharge or release button 47. An individual chart 54 is shown in FIG. 17, the charts being formed of suitable paper or other desirable material and being generally circular in shape as is conventional in this type of recording meter. The charts are formed with a central aperture 55 of such diameter as to have a freely sliding fit upon the hub 23, along with a radial notch, slot or opening 56 extending outwardly from the aperture 55 a distance sufficient, and having a width sufficient to receive the pin 27 as shown in FIGS. 2 and 3. The charts 54 carry the usual graph abscissa and ordinate lines 57 on their recording surface so that variable data may be inscribed thereon on a time basis or other basis such as mileage or the like.

In use, the stack of charts 53 is confined upon the hub 23 as shown in FIGS. 2 and 3 by means to be described hereinafter, and as will appear more fully the outermost one of the stack of charts will be periodically and automatically discharged until the entire stack of charts has been utilized, at which time a new stack of charts is placed on the recording device.

For supplying a rigid rearward support for the stack of charts 54 so that the stylii 11 may accurately and positively record data thereon, a chart disk 58 is provided, the disk being thin and of circular configuration with an enlarged circular opening 59 at its center for engagement with the shoulder 33 of the chart plate support 28, the portion of the chart disk 58 surrounding the opening 59 abutting against the forward face of the marginal flange 31 of the plate 28 and the forward face of the disk being coplanar with the forward face of the plate 28. Closely adjacent the edge of the central opening 59 the disk 58 carries a plurality of rearwardly projecting headed knobs or buttons 60 received in longitudinal openings 61 formed in the margin of the flange 31 so as to intersect the groove 32. Within the groove 32 a locking wire 62 is positioned for circumferential movement by a radial handle 63, the wire 62 having offsets 64 for forming elongate circumferential wedge sections 65, one for each of the buttons or knobs 60, so that when the offset sections 64 are positioned adjacent the opening 61, the buttons may be inserted therethrough, but upon circumferential movement of the wire 62, the wedge portions 65 engage the shanks of the buttons to lock them within the openings 61.

Although the chart disk 58 is readily removable from the chart plate 28 by circumferential movement of the wire 62 to release the buttons 60, and the chart plate 28 is readily releasably from the hub 23 by removal of the wire 62, through unscrewing of the handle 63 which binds and joins the two free ends of the wire 62 together and by release of the chain 39, the chart disk and chart plate are normally held against rotation with respect to the hub 23 by means of the driving pin 27 which projects forwardly into a plane slightly forward of the rearward face of the button 47, as shown in FIG. 3 through a rectangular opening 66 in the plate 28. Thus, the plate 28 is held against movement with respect to the hub 23 and the buttons 60 hold the chart disk against rotational movement with respect to the chart plate 28. Further, the extension of the drive pin 27 through the slots or notches 56 of the recording charts 54 lock the charts against rotation with respect to the chart disk or the chart plate.

When a new stack of recording charts is to be placed upon the chart disk, the discharge button 47 is removed by a suitable tool 67 having in its peripheral face a longitudinal groove 68 for alinement with and reception by the drive pin 27, and the chart disk 58 and chart plate 28 moved rearwardly upon the hub 23, compressing the spring 34 and exposing the forward portion of the hub 23 for reception of a stack of recording charts thereon. In order that the chart disk and chart plate need not be held manually in their rearward or retracted position during this operation, the drive pin 27 has cut in one circumferentially facing and lateral wall thereof a square sided notch 69, as shown in FIGS. 6 and 7, so that when the chart disk 28 has been moved rearwardly far enough to bring its opening 66 into alinement with the notch 69, the chart plate may be rotated slightly upon the hub 23 to engage one margin of the opening 66 in the notch 69, as shown in FIG. 7, and thus hold the chart plate and the chart disk against returning to their forward position. Desirably, the drive pin 27 carries a laterally projecting lug 70 rearwardly of the notch 69 to facilitate ready tactile alinement of the opening 66 with the notch 69, the combined cross-section of the lug 70 and drive pin 27 being greater than that of the openings 66 so as to limit rearward movement of the chart plate 28.

As the central apertures 55 of the recording charts 54 are to be alined with one another and received upon the hub 23, and the radial slots or notches 56 of the charts are to be alined with one another and received upon the drive pin 27, a suitable tool 71 is provided for the positioning of the recording charts properly upon the chart plate and disk and is shown in FIG. 4. The tool 71 includes a base member 72 having projecting therefrom a cylindrical, tubular spindle 73 having an axial bore 74 sufficiently large to receive the head 43 of the discharge shaft 22, and having its outer end reduced to form an axial pilot 75 for reception in the recess 42 on the outer end of the hub 23. The spindle 73 has approximately the diameter of the hub 23 and is adapted to be received in the central apertures 55 of the recording charts. Offset radially from the spindle 73 and extending parallel thereto from the base 72 is a pilot pin 76 of the same cross-sectional shape and size as the drive pin 27 and having on its outer end a small cylindrical lug 77 for reception in a complementary recess 78 formed in the outer end of the drive pin 27. Thus, a stack of recording charts with the apertures 55 and slots 56 alined may be positioned upon the tool 71 as indicated in FIG. 4 and shown in FIG. 5, the pilot 75 of the spindle 73 engaged in the recess 42 while the lug 77 is engaged in the recess 78, as shown in FIG. 5, after which the stack of charts properly alined are easily slipped from the tool 71 onto the hub 23 and drive pin 27. Thereafter, the tool 71 is retracted, the discharge button 47 replaced, and the chart plate 28 revolved slightly to disengage the wall of the opening 66 from the notch 67, whereupon the spring 34 moves the chart plate 28 and chart disk 53 forwardly holding the stack of charts snugly against the rearward face of the discharge button 47.

The clock housing 16 carries a rigid, internal supporting partition 79 extending thereacross adjacent its rearward wall, and the rearward wall is cut away to form an opening 80 closed by a dished cover plate 81 for reception and enclosure of a fly-back mechanism 82 utilized for periodic revolution of the discharge shaft 22 to discharge the outermost of the stack of the recording charts 53. The fly-back mechanism is generally the same as that shown and described in the aforementioned United States Letters Patent No. 2,978,287, and again, reference is made thereto. The rearward end of the shaft 20 extends through the support plate 79 and carries upon its rearward extremity an annular outwardly extending flange plate 83 disposed approximately in the plane of the opening 80 and having pivotally mounted at 84 upon its rearward surface an arcuate spring-pressed pawl 85, one end of the pawl 85 being urged constantly inwardly and carrying an inwardly directed, radial shoulder 86 facing clockwise as viewed in FIG. 13 from the rear of the meter changing device. The end of the pawl 85 carrying the shoulder 86 is provided with a release pin 87 projecting through a slot 88 in the flange 83 (FIG. 16), and a spring-pressed releasing cam 89 is rotatably positioned upon the shaft 20 forwardly of the flange 83 for engaging the pin 87 and swinging the pawl, along with its shoulder 86, radially outwardly.

The chart release shaft 22 extending rearwardly through the shaft 20 projects rearwardly thereof beyond the flange 83, and has secured upon its rearward extremity a hub 90 formed with an annular outwardly extending pawl member 91 immediately rearward of the flange 83 and disposed approximately in the plane of the pawl 85. As shown in FIG. 13, the pawl member 91 has a radially outwardly extending shoulder 92, facing counterclockwise as viewed from the rear as shown in FIG. 13 and adapted to engage the shoulder 86. A coiled spring 93 constantly urges the pawl member 91 to revolve counterclockwise, as viewed in FIG. 13.

The entire fly-back assembly, including the spring 93, is carried upon and rotatable with a large gear wheel 94 rotatably mounted upon the shaft 20 between the supporting partition 79 and the cam member 89, friction clips 95 overlying the marginal edges of the gear wheel 94 and being secured to the partition 79 for frictionally resisting movement of the gear wheel with respect to said partition. In particular, the gear wheel 94 carries a spider and cage structure 96 to which one end of the coil spring 93 is secured at 97 (FIG. 10) so as to cause the coil spring 93 to urge the coil member 91 constantly counterclockwise as viewed in FIG. 13. The gear wheel 94 also carries rearwardly projecting pins 98 delineating the arc of travel of the cam member 89, as well as a rearwardly projecting spring lug 99 adapted to engage a pin 100 extending forwardly of the flange 83 to prevent rotation of the flange and the shaft 20 in a reverse direction.

In the operation of the fly-back mechanism, the recording charts will be revolving in a counterclockwise direction, as viewed in FIG. 18 such as is customary in this type of recording meter, and accordingly, the flange 83 and the shaft 20 will be revolving clockwise, as viewed in FIG. 13. At this point, the pawl pin 87 will be in a position clockwise of the release lug 89. The shoulder 86 will be spring-pressed and held inwardly in engagement with the shoulder 92 so that the pawl plate 91 and the shaft 22 will also be revolving clockwise as viewed in FIG. 13. Thus, the entire front assembly of the mechanism, including the chart plate and disk, the recording charts, and the discharge button 47 will all be turning together and in unison. Such simultaneous revolution continues throughout one complete revolution of the recording charts, and data will be inscribed upon the outermost one thereof by the stylii 11 around the entire circumference thereof. At the same time, the gear wheel 94 will remain stationary as will its cam element 89 which, as viewed in FIG. 12, is urged counterclockwise by its spring against the counterclockwise pin 98.

Now, as the fly-back assembly continues its clockwise rotation as viewed in FIG. 13, the pawl pin 87 carried by the pawl 85 will approach and engage the inclined outer end of the pawl cam 89, causing the cam to swing clockwise against the clockwise stop pin 98 and ultimately forcing the pin 87 to move outwardly in the slot 88, swinging the shoulder 86 of the pawl 85 outwardly so as to disengage it from the shoulder 92. During the preceding revolution of the pawl disk 91 and its hub 90 the fly-back spring 93 will have been forced into a more tightly wound condition as will be apparent from an examination of FIGS. 10 and 14, and accordingly, when the shoulders 86 and 92 become disengaged, the pawl disk 91 will be quickly revolved by the spring 93 in a counterclockwise direction as viewed in FIG. 13, thus revolving the release shaft 22 counterclockwise, or clockwise as viewed in FIGS. 1 and 18. At this time, the pin 100 will have moved over and past the spring lug 99, thus holding the flange 83 and shaft 20 against reverse revolution, and the discharge button 47 will quickly undergo one reverse revolution to discharge the outermost recording chart as disclosed and described in the aforesaid United States Letters Patent No. 2,978,287, whereupon the spring 34 will move the next outermost chart into engagement with the rearward face of the discharge button 47 and the stylii 11 will immediately commence recording data upon the new chart while the discharged chart drops into the receptacle 14. The revolution of the release button 47 is so rapid that essentially no recording of data is lost so that the stylii 11 continue to operate for all practical purposes on a continuous basis.

As the pawl plate 91 commences its reverse revolution and as soon as the shoulders 86 and 92 have cleared one another, the pawl 85 will immediately be swung upon its pivot 84 by the springs provided therefor so that the shoulder 86 will be in a position to catch and engage the shoulder 92 upon the completion of one revolution of the pawl plate 91 and the discharge button 47 so that only a single recording chart is discharged. This action is further enhanced by the fact that as soon as the pin 87 has moved past the outer end of the cam member 89, the latter will return to engagement with the counterclockwise stop pin 98, thus positively releasing the pawl 85 for return to its normal position, and thereafter, the operation will repeat, the release button 47 being turned through one very rapid reverse revolution upon the completion of each forward revolution of the recording charts.

It is noted that the recording needles of the stylii 11 indicate the moment at which data is being taken, and that the relative rotational position of the discharge cam 89 with respect to the recording pins of the stylii will determine the time or point during a revolution of the recording charts at which the outermost chart will be discharged. Manifestly, it is desirable to make provision for altering this time or point of discharge, and for this reason, the gear wheel 94 is mounted rotatably upon the shaft 20 as previously noted, but held against unintentional or random movement by reason of the friction clamps 95.

To provide for rotational adjustment of the gear wheel 94 and thus selective variation in the time or point of discharge of the outermost chart, a spur gear 101 meshes with the gear wheel 94 and is carried upon a shaft 102 (FIG. 20) journaled in the supporting plate 79 and extending through the forward wall of the clock housing 16 to receive an operating knob and dial 103. As shown in FIG. 9, the dial 103 is readily visible from the front of the assembly and may be revolved clockwise for discharge of the outermost chart at a later time, or counterclockwise for discharge of the chart at an earlier time. Since the clips 95 only frictionally engage the gear wheel 94, they need not be loosened to effect such revolution, and clearly, turning of the gear and dial 103 will revolve the spur gear 101 to turn the gear wheel 94 and shift as may be desired the relative rotational position of the cam 89 with respect to the stylii 11. Of course, the entire chart plate assembly, along with the charts mounted thereon, is turned at the same time. The dial portion of the knob and dial 103 may be calibrated in any suitable or desirable fashion in minutes, fractions of hours, and the like, to provide indication of the span of time over which the discharge point is being altered either earlier or later. The chart disk is suitably cut away (not shown) to allow frontal access to the dial and knob 103 as well as the winding pin for the clock.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. In a chart changer for recording meters in which a stock of superposed recording charts are revolved about an axis with a chart plate for the recording of data on the outermost chart, a chart plate, means for driving the chart plate around said axis on a time-controlled basis, means for releasing from the chart plate the outermost chart at a predetermined time including means on the rearward side of the chart changer disposed angularly with respect to said axis, and means on the forward side of the chart changer immediately beneath the chart plate for shifting the angular position of the angularly-disposed means with respect to said axis for varying the time at which the outermost chart is released from the chart plate.

2. In a chart changer as set forth in claim 1 wherein the driving means for the chart plate includes a central hub for reception in the centers of the superposed charts, the central hub having a forward end for reception in the charts and a rearward end, an annular flange carried by the rearward end of the hub, means for revolving the central hub and the flange, the means for releasing from the chart plate the outermost chart including a retaining member at the forward end of the hub for retaining the stack of charts on the central hub and means for turning the retaining member independently of the central hub to discharge the outermost chart of the stack of charts, a chart plate support carrying the chart plate and freely revolvably mounted upon the central hub between the retaining member and the flange, and a driving pin carried by the flange and having its forward end extending through the chart plate support in driving relationship therewith and projecting forwardly to approximately the transverse plane of the forward end of the central hub.

3. In a chart changer for recording meters in which a stack of superposed recording charts are revolved about an axis with a chart plate for the recording of data on the outermost chart, a chart plate means for driving the chart plate around said axis on a time-controlled basis, means for releasing from the chart plate the outermost chart at a predetermined time including a cam disposed angularly with respect to said axis, a gear wheel carrying the cam, a spur gear engaging the gear wheel, and means immediately beneath the chart plate for rotating the spur gear to rotate the gear wheel angularly about said axis and vary the time at which the outermost chart is released from the chart plate.

4. In a chart changer as set forth in claim 3 wherein the driving means for the chart plate includes a central hub for reception in the centers of the superposed charts, the central hub having a forward end for reception in the charts and a rearward end, an annular flange carried by the rearward end of the hub, means for revolving the central hub and the flange, the means for releasing from the chart plate the outermost chart including a retaining member at the forward end of the hub for retaining the stack of charts on the central hub and means for turning the retaining member independently of the central hub to discharge the outermost chart of the stack of charts, a chart plate support carrying the chart plate and freely revolvably mounted upon the central hub between the retaining member and the flange, and a driving pin carried by the flange and having its forward end extending through the cam plate support in driving relationship therewith and projecting forwardly to approximately the transverse plane of the forward end of the central hub.

5. In a chart changer for recording meters in which a stack of superposed recording charts are revolved about an axis with a chart plate for the recording of data on the outermost chart, a chart plate, clock means for driving the chart plate around said axis on a time-controlled basis, chassis means in back of the chart plate for carrying the clock means, means for releasing from the chart plate the outermost chart at a predetermined time including a cam disposed angularly with respect to said axis in back of the chassis means, a gear wheel carrying the cam, a spur gear in back of the chassis means engaging the gear wheel, and means between the chart plate and the chassis means for rotating the spur gear to rotate the gear wheel angularly about said axis and thereby vary the time at which the outermost chart is released from the chart plate.

(References on following page)

References Cited by the Examiner

UNITED STATES PATENTS

| | | | |
|---|---|---|---|
| 576,453 | 2/97 | Henderson | 211—57 |
| 1,088,994 | 3/14 | Jenkins | 346—137 |
| 2,570,619 | 10/51 | Whitehouse | 211—54 |
| 2,703,745 | 3/55 | Smith | 346—121 |
| 2,926,059 | 2/60 | Squier | 346—137 |
| 2,950,821 | 8/60 | Hooper | 211—54 |
| 2,978,287 | 4/61 | Daugherty | 346—137 |
| 3,064,261 | 11/62 | Maeder | 346—137 |
| 3,109,694 | 11/63 | Mullins et al. | 346—137 |

FOREIGN PATENTS

| | | |
|---|---|---|
| 646,988 | 12/50 | Great Britain. |

LEO SMILOW, *Primary Examiner.*